(12) United States Patent
Singh et al.

(10) Patent No.: US 11,693,852 B1
(45) Date of Patent: Jul. 4, 2023

(54) SYSTEM, METHOD, AND COMPUTER PROGRAM FOR NORMALIZING A JSON STRUCTURE

(71) Applicant: Amdocs Development Limited, Limassol (CY)

(72) Inventors: Robin Singh, Pune (IN); Poorab Joshi, Pune (IN); Mrinal Sinha, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/228,479

(22) Filed: Apr. 12, 2021

(51) Int. Cl.
*G06F 16/242* (2019.01)
*G06F 16/22* (2019.01)
*G06F 16/28* (2019.01)

(52) U.S. Cl.
CPC ........ *G06F 16/244* (2019.01); *G06F 16/2291* (2019.01); *G06F 16/2448* (2019.01); *G06F 16/288* (2019.01)

(58) Field of Classification Search
CPC .............. G06F 16/244; G06F 16/2448; G06F 16/2291; G06F 16/288
USPC ........................................................ 707/737
See application file for complete search history.

(56) References Cited

U.S. PATENT DOCUMENTS

| 9,507,762 | B1 | 11/2016 | Lashley et al. |
| 9,613,068 | B2 | 4/2017 | Tsirogiannis et al. |
| 10,437,564 | B1 * | 10/2019 | Periwal ............... G06F 8/315 |
| 10,691,682 | B2 | 6/2020 | LeGault et al. |
| 2019/0179948 | A1 | 6/2019 | Benjamin-Deckert et al. |
| 2019/0392070 | A1 * | 12/2019 | Johnson .............. G06F 16/258 |
| 2021/0081389 | A1 * | 3/2021 | Liu ...................... G06F 16/244 |
| 2021/0117611 | A1 * | 4/2021 | Liu ...................... H03M 7/4031 |
| 2021/0173621 | A1 * | 6/2021 | Fender ................. G06F 8/433 |

FOREIGN PATENT DOCUMENTS

| CN | 106815246 A | * | 6/2017 |
| CN | 106815246 A | | 6/2017 |
| CN | 110110150 A | * | 8/2019 |

* cited by examiner

*Primary Examiner* — Giovanna B Colan
(74) *Attorney, Agent, or Firm* — Zilka-Kotab, P.C.

(57) ABSTRACT

As described herein, a system, method, and computer program are provided for normalizing a JSON structure. In use, input defining at least one entity type of a target data structure is received. A source JSON structure is identified. The source JSON structure is traversed for a particular JSON data type to map values in the source JSON structure to corresponding entities of the target data structure based on the at least one entity type defined for the target data structure, where each entity of the target data structure is defined using a relative path between nodes of the source JSON structure.

19 Claims, 10 Drawing Sheets

| Entity Key | Relative Path | Merged Node |
|---|---|---|
| Resource | / | /resource,resource/personOccupation |
| PersonOccupation | / | /resource,resource/personOccupation |
| PersonDetails | resource/personOccupation | personOccupation/additionalDetails |
| AdditionalDetails | personOccupation/additionalDetails | |

FIG. 3A

| Schema Entity Key | Attribute Key | Mandatory | Json Path |
|---|---|---|---|
| Resource | name | | |
| Resource | type | | |
| Resource | systemDate | | |
| Resource | eventId | Y | |
| Resource | eventDate | | |
| Resource | eventName | | |
| Resource | contractId | Y | |
| Resource | contractVersion | | |
| Resource | customerId | Y | |
| Resource | pobId | Y | |
| Resource | pobVersion | | |
| PersonOccupation | name | | |
| PersonOccupation | type | | |
| PersonOccupation | contractId | Y | |
| PersonOccupation | customerId | Y | |
| PersonOccupation | systemDate | | |
| PersonOccupation | pobId | Y | |
| PersonOccupation | pobVersion | | |
| PersonInformation | headerName | Y | /name |
| PersonInformation | eventId | Y | /resource/eventId |
| PersonInformation | parentCustomerId | Y | /resource/customerId |
| PersonInformation | personId | Y | |
| PersonInformation | personName | | |
| PersonDetails | eventId | Y | /resource/eventId |
| PersonDetails | pobId | Y | |
| PersonDetails | detailsid | Y | personOccupation/additionalDetails/id |
| PersonDetails | reference | | |
| AdditionalDetails | pobId | Y | resource/personOccupation/pobId |
| AdditionalDetails | id | Y | |
| AdditionalDetails | reference | | |

FIG. 3B

| Sr. No | Mapping Name | Type | Description | Initialization Phase |
|---|---|---|---|---|
| 1 | nodeNameStack | Stack<String> | This stack of String will hold all the node name from root to current node at any time. This Stack is used to identify the correct parent in case of nodes are repeated in recursive way. | During Parsing |
| 2 | nodeRelationMap | Map<String, Set<String>> | Holds the relative parent/child key as node and entity name as value. This helps identifying which entity to be mapped with current JSON Node | During Parser initialization |
| 3 | ComplexObjectInformations | Stack<ComplexObjectInformation> | This stack of complex object maintains list of all array/object node to be parsed. Since the algorithm ensures first to parse all the leaf node first and then move to child object. Any child object encountered will be stored in this stack with relevant details. | During Parsing |
| 4 | ComplexObjectInformation | Class | Object which contains all the information for child node to get parsed. | During Parsing |
| 5 | entityToForeignkeyMap | Map<String, Set<String>> | Map which holds key as parent/child node and value as node name. For all the foreign key defined in application yml, this map will contain information of all nodes where a leaf node is an foreign key. | During Parser initialization |
| 6 | parentNodeValueMap | Map<String, Stack<String>> | Based on entityToForeignkeyMap which are foreign key to their child nodes. The Child Nodes are stored in a stack so that in case of recursion all the parents FK value is maintained. | During parsing |
| 7 | jsonKeyAttributeNestedObject | Map<String, String> | Holds the node as key and entity as value. This nodes signifies that if such node is encountered the Attribute key name is different and corresponding value to be parsed accordingly. | During Parser initialization |

FIG. 3C

Schema Entity Definition:

| Entity Key | Relative Path | Merged Node |
|---|---|---|
| Resource | / | /resource |

Entity Attribute Definition:

| Schema Entity Key | Attribute Key | Mandatory | Json Path |
|---|---|---|---|
| Resource | name | | |
| Resource | type | | |
| Resource | systemDate | | |
| Resource | eventId | Y | |
| Resource | eventDate | | |
| Resource | eventName | | |
| Resource | contractId | Y | |
| Resource | contractVersion | | |
| Resource | customerId | Y | |

FIG. 4A

Schema Entity:

| Entity Key | Relative Path | Merged Node |
|---|---|---|
| Resource | / | /resource,resource/personOccupation |

Entity Attribute:

| Schema Entity Key | Attribute Key | Mandatory | Json Path |
|---|---|---|---|
| Resource | name | | |
| Resource | type | | |
| Resource | systemDate | | |
| Resource | eventId | Y | |
| Resource | eventDate | | |
| Resource | eventName | | |
| Resource | contractId | Y | |
| Resource | contractVersion | | |
| Resource | customerId | Y | |
| Resource | pobId | Y | |
| Resource | pobVersion | | |

FIG. 4B

*Schema Entity:*

| Entity Key | Relative Path | Merged Node |
|---|---|---|
| Resource | / | /resource,resource/personOccupation |
| PersonOccupation | / | /resource,resource/personOccupation |

*Entity Attribute:*

| Schema Entity Key | Attribute Key | Mandatory | Json Path |
|---|---|---|---|
| Resource | name | | |
| Resource | type | | |
| Resource | systemDate | | |
| Resource | eventId | Y | |
| Resource | eventDate | | |
| Resource | eventName | | |
| Resource | contractId | Y | |
| Resource | contractVersion | | |
| Resource | customerId | Y | |
| Resource | pobId | Y | |
| Resource | pobVersion | | |
| PersonOccupation | name | | |
| PersonOccupation | type | | |
| PersonOccupation | contractId | Y | |
| PersonOccupation | customerId | Y | |
| PersonOccupation | systemDate | | |
| PersonOccupation | pobId | Y | |
| PersonOccupation | pobVersion | | |

FIG. 4C

Schema Entity:

| Entity Key | Relative Path | Merged Node |
|---|---|---|
| Resource | / | /resource,resource/personOccupation |
| PersonOccupation | / | /resource,resource/personOccupation |
| PersonInformation | resource/personInfo | |

Entity Attribute - Defining attributes of *PersonInformation* entity by mapping attributes from its parent entities as a Foreign keys:

| Schema Entity Key | Attribute Key | Mandatory | Json Path |
|---|---|---|---|
| Resource | name | | |
| Resource | type | | |
| Resource | systemDate | | |
| Resource | eventId | Y | |
| Resource | eventDate | | |
| Resource | eventName | | |
| Resource | contractId | Y | |
| Resource | contractVersion | | |
| Resource | customerId | Y | |
| Resource | pobId | Y | |
| Resource | pobVersion | | |
| PersonOccupation | name | | |
| PersonOccupation | type | | |
| PersonOccupation | contractId | Y | |
| PersonOccupation | customerId | Y | |
| PersonOccupation | systemDate | | |
| PersonOccupation | pobId | Y | |
| PersonOccupation | pobVersion | | |
| PersonInformation | headerName | Y | /name |
| PersonInformation | eventId | Y | /resource/eventId |
| PersonInformation | parentCustomerId | Y | /resource/customerId |
| PersonInformation | personId | Y | |
| PersonInformation | personName | | |

FIG. 4D

*Schema Entity:*

| Entity Key | Relative Path | Merged Node |
|---|---|---|
| Resource | / | /resource,resource/personOccupation |
| PersonOccupation | / | /resource,resource/personOccupation |
| PersonDetails | resource/personOccupation | personOccupation/additionalDetails |
| AdditionalDetails | personOccupation/additionalDetails | |

*Entity Attribute*

| Schema Entity Key | Attribute Key | Mandatory | Json Path |
|---|---|---|---|
| Resource | name | | |
| Resource | type | | |
| Resource | systemDate | | |
| Resource | eventId | Y | |
| Resource | eventDate | | |
| Resource | eventName | | |
| Resource | contractId | Y | |
| Resource | contractVersion | | |
| Resource | customerId | Y | |
| Resource | pobId | Y | |
| Resource | pobVersion | | |
| PersonOccupation | name | | |
| PersonOccupation | type | | |
| PersonOccupation | contractId | Y | |
| PersonOccupation | customerId | Y | |
| PersonOccupation | systemDate | | |
| PersonOccupation | pobId | Y | |
| PersonOccupation | pobVersion | | |
| PersonInformation | headerName | Y | /name |
| PersonInformation | eventId | Y | /resource/eventId |
| PersonInformation | parentCustomerId | Y | /resource/customerId |
| PersonInformation | personId | Y | |
| PersonInformation | personName | | |
| PersonDetails | eventId | Y | /resource/eventId |
| PersonDetails | pobId | Y | |
| PersonDetails | detailsId | Y | personOccupation/additionalDetails/id |
| PersonDetails | reference | | |
| AdditionalDetails | pobId | Y | resource/personOccupation/pobId |
| AdditionalDetails | id | Y | |
| AdditionalDetails | reference | | |

SYSTEM, METHOD, AND COMPUTER PROGRAM FOR NORMALIZING A JSON STRUCTURE

FIELD OF THE INVENTION

The present invention relates to techniques for transforming data in a semi-structured format.

BACKGROUND

Enterprises are now inclined to store data in semi-structured format (e.g. JSON) instead of using a traditional relational database model. Such data does not provide any relational information among it and cannot utilize the complete potential of query engines. This is problematic to businesses who wants to transform this semi-structured data with any other data sources.

For current analytical, transformation or reporting tools, query engines are still widely used. Currently, for such use cases, a user has to write custom logic to convert the semi-structured data into a structured format. However, these methodologies do not have high reusability value, for instance because any change in a JSON structure will cause a rewrite of the custom logic. This approach incurs high cost and effort.

There is no common approach to address this issue currently. Currently there are tools to extract part of JSON or to help a user to fully expand the JSON as a flat name value pair. However, there are still gaps in trying to make this information relational and useful. There is no methodology present right now which can parse through any JSON structure and extract data as per user configuration.

There is thus a need for addressing these and/or other issues associated with the prior art.

SUMMARY

As described herein, a system, method, and computer program are provided for normalizing a JSON structure. In use, input defining at least one entity type of a target data structure is received. A source JSON structure is identified. The source JSON structure is traversed for a particular JSON data type to map values in the source JSON structure to corresponding entities of the target data structure based on the at least one entity type defined for the target data structure, where each entity of the target data structure is defined using a relative path between nodes of the source JSON structure.

BRIEF DESCRIPTION OF THE DRAWINGS

FIGS. 3A-C illustrate metadata used for normalizing a JSON structure, in accordance with various embodiments.

DETAILED DESCRIPTION

Figure 1:
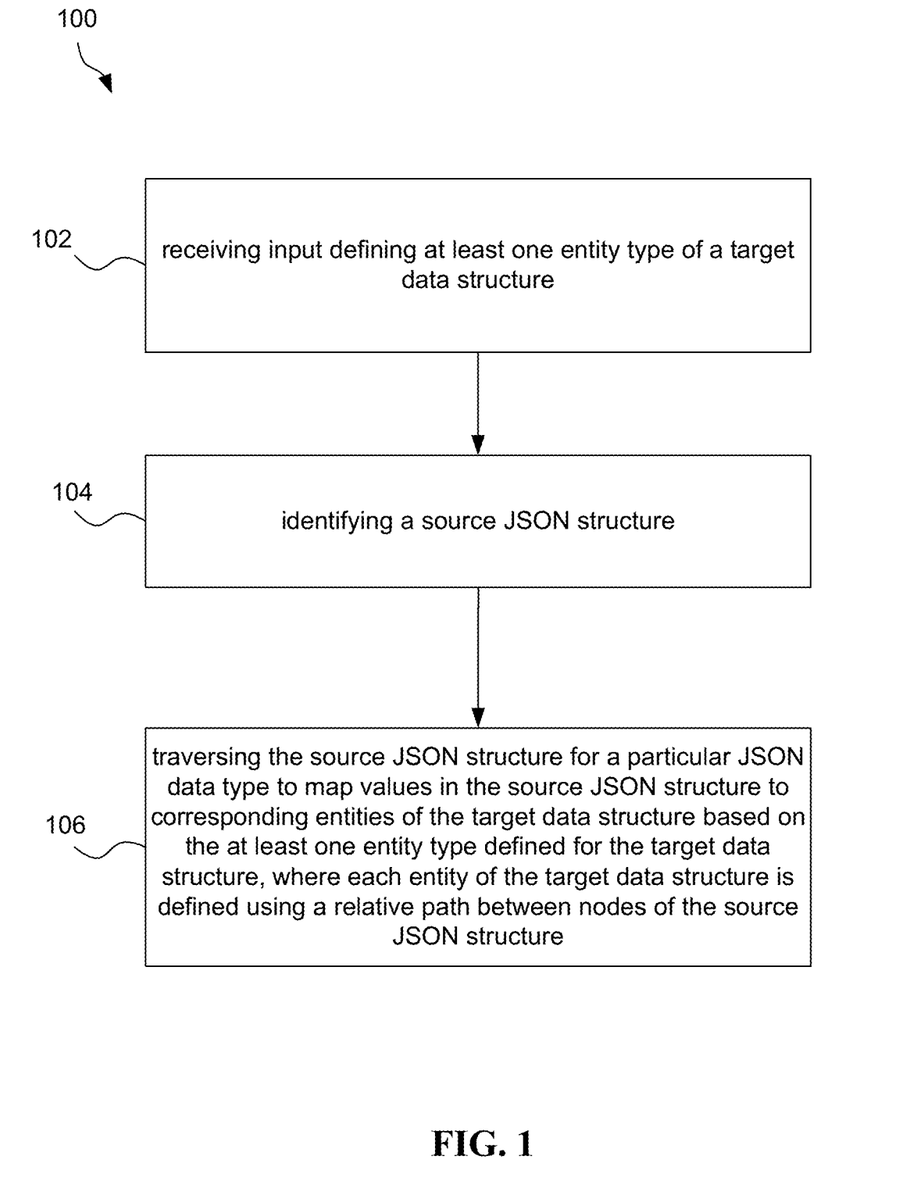
FIG. 1 illustrates a method for normalizing a JSON structure, in accordance with one embodiment.

FIG. 1 illustrates a method 100 for normalizing a JSON structure, in accordance with one embodiment. The method 100 may be performed any computer system described below with respect to FIGS. 5 and/or 6. For example, the method 100 may be performed by a local computer system or a remote computer system (e.g. in the cloud). In any case, the method 100 is performed to normalize a source JSON data structure (i.e. that is semi-structured) into a target (i.e. structured) data structure.

In operation 102, input defining at least one entity type of a target data structure is received. The input may be received from a user. For example, the input may be received from the user via a user interface or a configuration file.

Additionally, the input may define any entity types stored by the target data structure. An entity type refers to a particular format of an entity represented in the target data structure. In various embodiments, the input may define single entity type of the target data structure, or alternatively may define two or more entity types of the target data structure.

In one embodiment, the input defines a data configuration for each entity type of the target data structure. In another embodiment, the input defines attributes of each entity type of the at least one entity type. Optionally, the input may define each attribute as optional or mandatory. In yet another embodiment, the input may define one or more foreign keys for each entity type of the at least one entity type. In still yet another embodiment, the input may define one or more of the entity types as a merged node. The merged node may represent multiple nodes of the source JSON structure.

In operation 104, a source JSON structure is identified. The source JSON structure may identified based on input (e.g. of a user). For example, the source JSON structure may be provided as input for the purpose of normalizing the source JSON structure, per the method 100.

In operation 106, the source JSON structure is traversed for a particular JSON data type to map values in the source JSON structure to corresponding entities of the target data structure based on the at least one entity type defined for the target data structure, where each entity of the target data structure is defined using a relative path between nodes of the source JSON structure. The particular JSON data type may be a JSON message containing plain key value pairs, a JSON message containing key value pairs and one array of complex object, a JSON message containing key value pairs and two parallel arrays of complex object, or a JSON message containing key value pairs and nested arrays of complex object. In an embodiment, the method 100 may be repeated for each different JSON data type of a plurality of different JSON data types.

As described in more detail below, the source JSON structure may be traversed in a manner such that each node of the source JSON structure is traversed exactly once. In one embodiment, traversing the source JSON structure includes extracting metadata from the source JSON structure. The metadata may include all mapped values, a foreign key map that maintains a list of attributes capable of being used as a foreign key, a parent entity map that maintains a list of entities having a common relative path (e.g. where each relative path is path between an object node being traversed and its parent node in the source JSON structure), and/or other types of metadata. In any case, the metadata may be used to map the values in the source JSON structure to the corresponding entities of the target data structure. As noted above, each entity of the target data structure is defined using the relative path between nodes of the source JSON structure (e.g. as determined from the metadata). To this end, use of the relative path in this manner allows for the normalized structure to be extracted from the current JSON node being traversed.

After traversing the source JSON structure to map the values in the source JSON structure to the corresponding entities of the target data structure, the target data structure may be output. For example, the target data structure may be output to a memory for storage. As another example, the target data structure may be output (e.g. published, made accessible, etc.) for allowing the target data structure to be queried.

To this end, the method 100 described above is capable of converting semi-structured data in a JSON format to a structured data format. This method 100 is generic in nature, and can be used by any source system. The user can simply define the configuration for the target data structure instead of making custom changes. Moreover, the method 100 is not dependent on the structure of the JSON data, and thus can be applied to any JSON data type.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
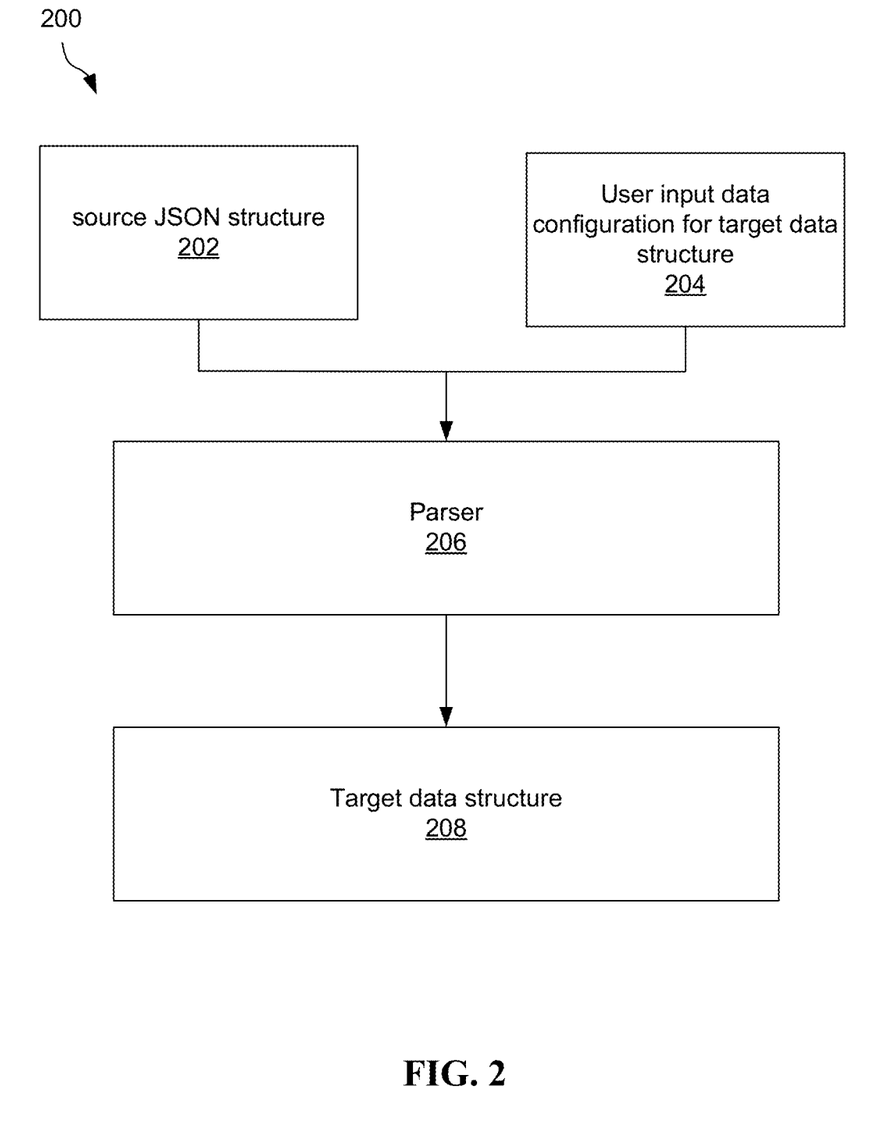
FIG. 2 illustrates a block diagram of the data flow for generating a normalized JSON structure, in accordance with one embodiment.

FIG. 2 illustrates a block diagram of the data flow 200 for generating a normalized JSON structure, in accordance with one embodiment. As an option, the data flow 200 may be implemented in the context of the details of the previous figure and/or any subsequent figure(s). Of course, however, the data flow 200 may be implemented in the context of any desired environment. Further, the aforementioned definitions may equally apply to the description below.

As shown, a source JSON structure 202 and a user input data configuration 204 for a target data structure 208 are input to a parser 206. The parser 206 may be implemented as computer hardware, software, or a combination thereof, but in any case is configured to normalize the source JSON structure 202 based on the user input data configuration 204. As shown, the parser 206 normalizes the source JSON structure 202 into the target data structure 208, as shown. The parser 206 may perform the method 100 of FIG. 1 to normalize the source JSON structure 202.

Overview of the Embodiments

The source JSON structure 202 may be understood as similar to a tree structure if viewed as a data structure. Accordingly, every JSON node will exhibits similar behavior to node of a tree. Generally these nodes are of 2 types:

1. Object Node: This is of object or array datatype which extends like a branch from its parent.

2. Leaf Node: This node holds some primitive value in alphanumeric format in a JSON document.

For extracting data from the source JSON structure 202, the user just needs to define entities of the target data structure. An entity is a singular view of all the leaves inside an arbitrary Object Node. An entity is defined by providing the XPath (or Relative Path) of any Object Node. The reason XPath is used is due to its query language orientation and simplicity of usage. One advantage of this methodology is the fact it does not require user to provide full XPath for an entity. Instead it can easily identify and extract all the information of an entity simply using the relative XPath of the corresponding Object Node. The relative XPath of an object Node is provided in format "parent ObjectNode/ Object Node". The approach enables logical traversal through all the Object Node only once and extract all the entity records required. This minimalist concept enables very low effort in configuring entities for any structure of JSON.

Apart from Relative Path, a Merged Node can optionally be defined for an entity which allows the user to merge child Object Node leaves in single entity records.

Combining the above two concepts of Relative Path and Merged Node, the following may be provided:

1. No standardization in entity definition. The user can define and configure the entities as per their requirements and need not be dependent of client configuration of JSON data.

2. Low cost of initial implementation and modification.

3. This user defining the entity need not be required to understand the whole JSON structure.

Apart from defining entities, the user can also define the entity attribute which will correspond to leaves inside the Object Node. The entity attribute can be defined as a mandatory or optional field. Based on the attribute definition, the methodology will handle the field in a required way.

As part of the entity attribute, the methodology also provides a capability to define any number foreign key attributes where any attribute from parent Object Nodes can be assigned to current entity records if the user wishes to maintain a relationship between entity records of a current object node and its parent object node.

To this end, the embodiments described herein use the minimalist concept of a Relative Path to parse and extract attributes in the Entity structure, in addition to options for a merged node and foreign key, as follows:

1. Relative Path: Defining an entity with only Parent JSON Node and Current JSON Node is enough to extract normalized structure from the current JSON Node. One embodiment uses XPath to define the Relative Path, however any kind of notation to extract information from JSON can be used to define the Relative path. The methodology can be adapted for any standard or customized notations.

2. Merged Node: Similar to relative path, but it allows user to customize the normalized records to be combination of multiple JSON Nodes. This gives the user the freedom customize their normalized structure as per their requirements.

3. Foreign Key (FK) Implementation: Apart from being able to map JSON Nodes from the current Node, the methodology also provides ways to fetch the value of certain attributes from Parent Nodes. This helps in implementing behavior similar to a foreign key constraint in a relational database. The user can have recursive JSON Nodes and still implement FKs where an attribute to from a parent recursive node can be mapped to an entity from inner recursive node entities. The methodology identifies such structure automatically and implements this option without needing user intervention.

Design Components

The parser 206 includes at least the following three functions:

1. Traversing tree structure
2. Extracting Data and MetaData
3. Mapping values to entities Traversing Tree Structure Table 1 illustrates an exemplary flow for traversing the source JSON structure 202.

TABLE 1

1. Start from root node and iterate through all the Nodes:
   a. If a JSON node is of Type Object Node, add it to a Stack of JSON Node Object
   b. If a JSON node is of type value, map its value in relevant entity
2. Check if the stack of JSON Node Object is updated. Loop through the stack for number of new nodes added from last node.
   a. If node type is of Array:
      i. Iterate through all index,
      ii. Go to Step 2-1.
   b. If node is object type
      i. Go to Step 1
3. Pop the node from stack.

Extracting Data and MetaData

This parsing mechanism ensures all the nodes are visited once by the parser 206. Thus, the present methodology relies on traversing through each node of the source JSON structure 202 only once. Any information picked from the parent Node which may be used in mapping values to the child node will be stored in a relevant data structure. The following metadata are maintained by the methodology:

Object Node: A Java class to keep all the entities' mapped values.

Foreign Key Map (FK Map): This FK Map maintains a list of attributes in a stack which can be used as foreign key for entities defined from child nodes.

Parent Entity Map: This Map maintains a list of entities mapped from entities from a specific relative path in a stack data structure. When a merged node is encountered for a same entity, the top Object Node is picked from the stack.

Other types of metadata may also be used, as described in more detail below with reference to FIGS. 3A-C.

Mapping Values to Entities

Table 2 illustrates an exemplary flow for mapping values to entities.

TABLE 2

1. At the start of each node, identify its parent node. Using current node and parent node, form current path.
2. Find the entities whose relative path is the same as the path formed in Step 1.
3. Find the entities whose merged node is the same as the path formed in Step 1.
4. If current relative path is from entity relative path create fresh Object Node.
5. If current relative path is from entity merged node, take top Object Node for same Entity from Parent Entity Map.
6. For the list of entities, when leaf node is iterated from Traversing tree structure in step 1.b (see Table 1 above):
   a. check if its node is part of any entity attribute. If yes map its value to entity Object Node.
   b. If a leaf is defined as an FK for other entity, add its value to a Stack of FK Map.
7. After all the nodes in the current node are iterated, check for all entity whether they need a FK. If a FK is needed, pick its top value from stack of FK Map and assign to entity.
8. When a node processing is completed fully:
   a. Clear all the FK which were added from the current node. Pop the top value of Stack from FK Map
   b. Clear all the parent entity mapped entry for current Node. Pop the top value of Stack from parent entity mapped FIGS. 3A-C illustrate metadata used for normalizing a JSON structure, in accordance with various embodiments.

Figure 3A:
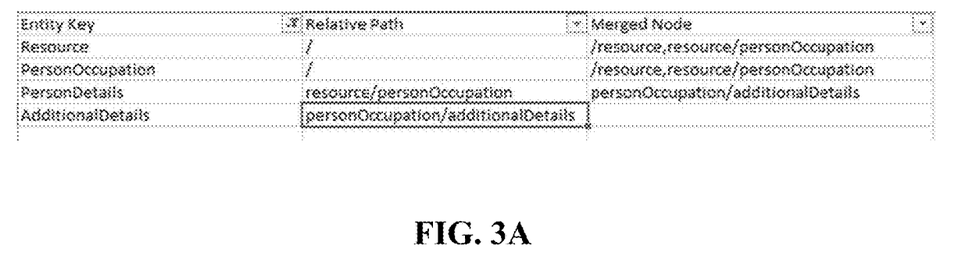

FIG. 3A illustrates the parent to child node (relative path) metadata only for Source Entities.

Figure 3B:
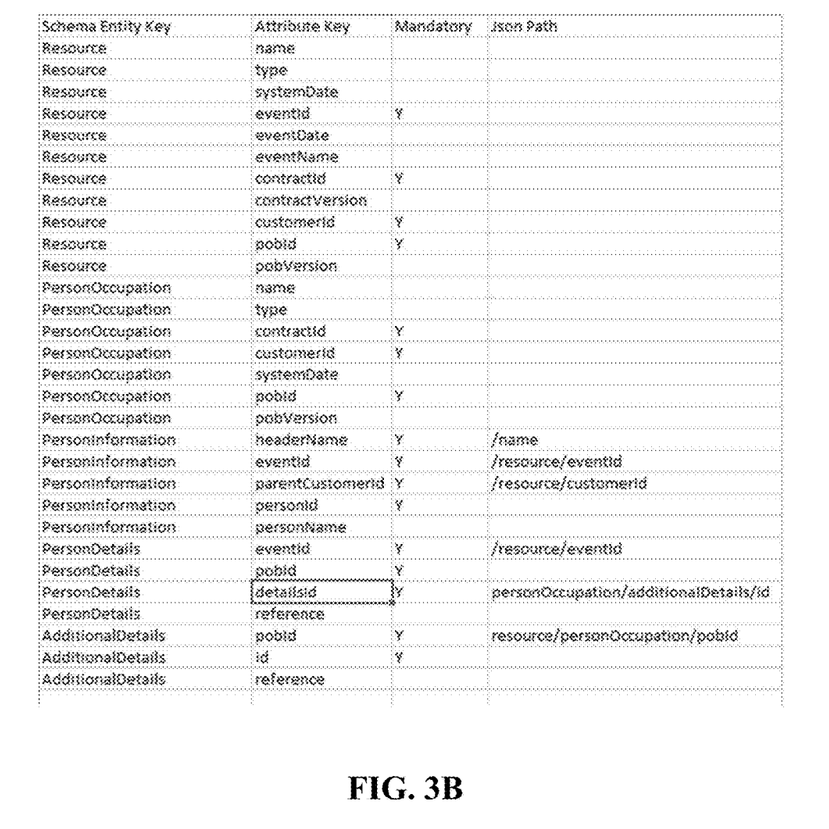

FIG. 3B illustrates attributes defined for each entity (without the JSON Path for each entity).

FIG. 3C illustrates additional metadata that may be captured for use by the parser.

Table 3 illustrates an exemplary flow for capturing the metadata.

TABLE 3

1. Fetch entity name from current parent and child node
2. Push Child Node to parser Flow
3. Find all the nodes in JSON. For all Json Node inside current Node
   a. If a Node is array of object, add the JSON node to complexObjectInformations stack.
   b. If a node is leaf node
      i. check nonMandatoryNestedObject with key as parent/child/nodeName.
         1. If it is not null, map the value to the attribute holding that node name.
         2. Else, check for attribute name with same node name and map the value accordingly
      ii. check if current node belongs to entitytoForeignKeyMap,
         1. if yes make entry in parentNodeValueMap with node details and push its value in stack
4. Check for foreign key constraint attributes in current entity. If exists,
   a. Identify correct parent from parserFlowStack.
   b. Check the existence of same parent in parentNodeValueMap and pick top value from stack. This top value to be mapped to existing entity attribute.
5. Map all attribute to parsed data maps.
6. Handle all Array/Object Nodes found Current complexObjectInformations stack
   a. For Top Object in stack,
   b. Peek the Top object.
   c. Pop the Top Object
   d. The top object is of Array type:
      i. For Each index in the Array Go to Step e
   e. The top object is of Object type:
      i. Go to Step 1 with parent Node as Current Child Node and Child Node as current Parent Node, current JSON element and current parsedData.
7. Pop top value from parentNodeValueMap if exists
8. Pop Child Node from Parser Stack Flow Map The Parser will use attribute details from the proto mapping and will map all the fields from the JSON Node with the Proto Fields.

As an option, in case JSON data is encountered that is being sent as part of a JSON String, it should be highlighted which node holds the JSON as string while providing the Entity Node Name.

FIGS. 4A-E illustrate exemplary mapping sheet implementations for different JSON structure types, in accordance with various embodiments.

As per the input JSON message format and the user's preferences, the implementer is responsible to create mapping sheets for the entities for the input Json message. The parser will then read configuration from the mapping sheet and parse the input json message into entities messages.

The following scenarios with respect to the input Json messages are considered while creating a mapping sheet and parsing the input JSON message in a Kafka collector. Each of the below scenarios explains the input JSON message format, a number of ways of implementing the mapping sheet, and a potential outcome from the parser.

The JSON structure supports only 4 types of data: string, number, Boolean, and NULL. For our collector structure, 1 more data type is supported: timestamp.

For numbers, the user can provide any of the following 3 ways to ensure correct precision is maintained by the collector while parsing the data: number; number(4) where 4 denotes the scale of the number; or number(4,3) where 4 is the scale and 3 is the precision.

Scenario 1: The Input JSON Message Contains Plain Key Value Pairs

Table 4 illustrates an exemplary input JSON message according to Scenario 1.

TABLE 4

```
{
"name": "CycleEvent",
"type": "CreateResource",
"systemDate": "2018-11-29T15:50:24.631Z",
    "resource": {
    "eventId": 1,
    "eventDate": "2018-11-27T07:47:10.240Z"
    "eventName": "Inception",
    "contractId": 2,
    "contractVersion": 1,
    "customerId": 22
    }
}
```

Figure 4A:
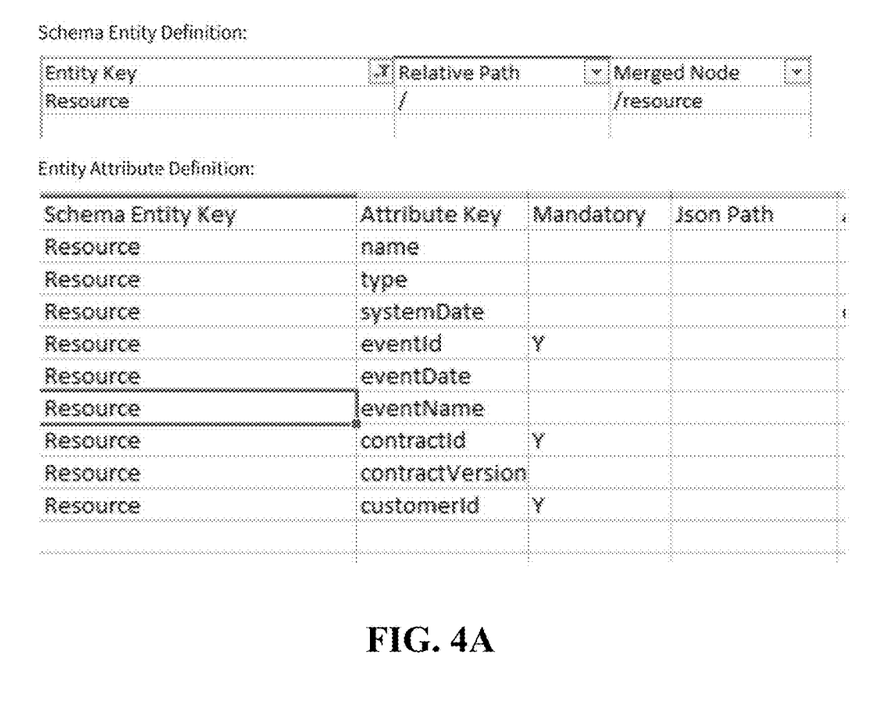
FIGS. 4A-E illustrate exemplary mapping sheet implementations for different JSON structure types, in accordance with various embodiments.

FIG. 4A illustrates a single entity being implemented in a mapping sheet, per Scenario 1.

Table 5 illustrates an exemplary output JSON message according to Scenario 1 and the mapping sheet of FIG. 4A.

TABLE 5

```
{
"entityKey": "Resource"
"name": "CycleEvent",
"type": "CreateResource",
"systemDate": "2018-11-29T15:50:24.631Z",
"eventId": 1,
"eventDate": "2018-11-27T07:47:10.240Z",
"eventName": "Inception",
"contractId": 2,
"contractVersion": 1,
"customerId": 22
}
```

Scenario 2: The Input JSON Message Contains Key Value Pairs and One Array of Complex Object Table 6 illustrates an exemplary input JSON message according to Scenario 2.

TABLE 6

```
{
"name": "CycleEvent",
"type": "CreateResource",
"systemDate": "2018-11-29T15:50:24.631Z",
    "resource": {
    "eventId": 1,
    "eventDate": "2018-11-27T07:47:10.240Z"
    "eventName": "Inception",
```

TABLE 6-continued

```
"contractId": 21,
"contractVersion": 1,
"customerId": 22,
"personOccupation": [{
    "pobId": 91,
    "pobVersion": 211,
    "contractId": 21
    },{
    "pobId": 191,
    "pobVersion": 221,
    "contractId": 21
    }]
    }
}
```

Figure 4B:
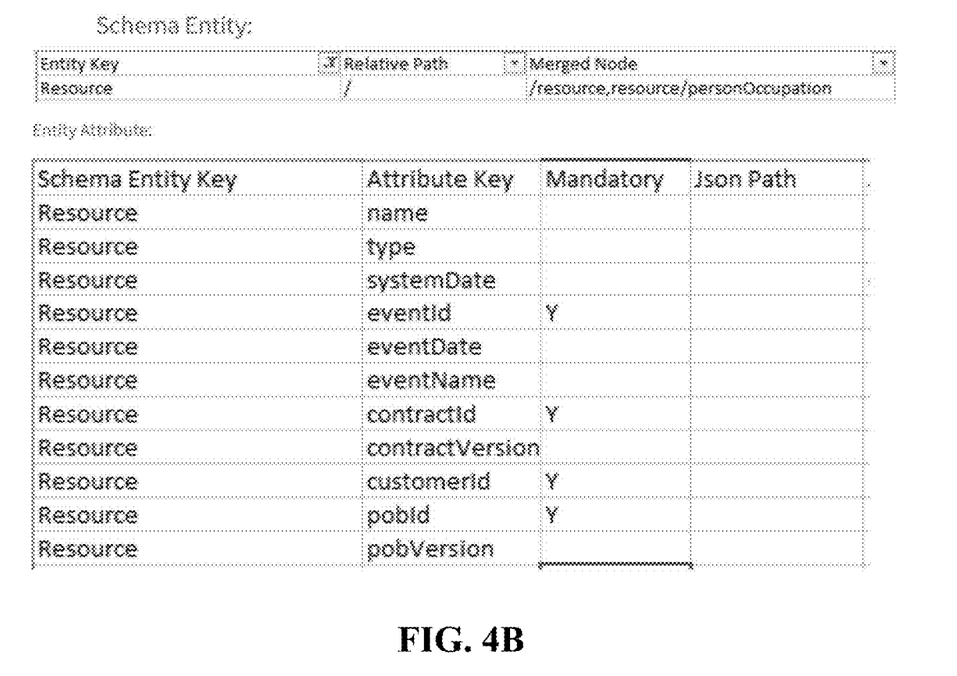

FIG. 4B illustrates a single entity being implemented in mapping sheet, per Scenario 2.

Table 7 illustrates an exemplary output JSON message according to Scenario 2 and the mapping sheet of FIG. 4B.

TABLE 7

```
{
"entityKey": "Resource"
"name": "CycleEvent",
"type": "CreateResource",
"systemDate": "2018-11-29T15:50:24.631Z",
"eventId": 1,
"eventDate": "2018-11-27T07:47:10.240Z",
"eventName": "Inception",
"contractId": 21,
"contractVersion": 1,
"customerId": 22,
"pobId": 91,
"pobVersion": 211
},
{
"entityKey": "Resource"
"name": "CycleEvent",
"type": "CreateResource",
"systemDate": "2018-11-29T15:50:24.631Z"
"eventId": 1,
"eventDate": "2018-11-27T07:47:10.240Z",
"eventName": "Inception",
"contractId": 21,
"contractVersion": 1,
"customerId": 22,
"pobId": 191,
"pobVersion": 221
}
```

Figure 4C:
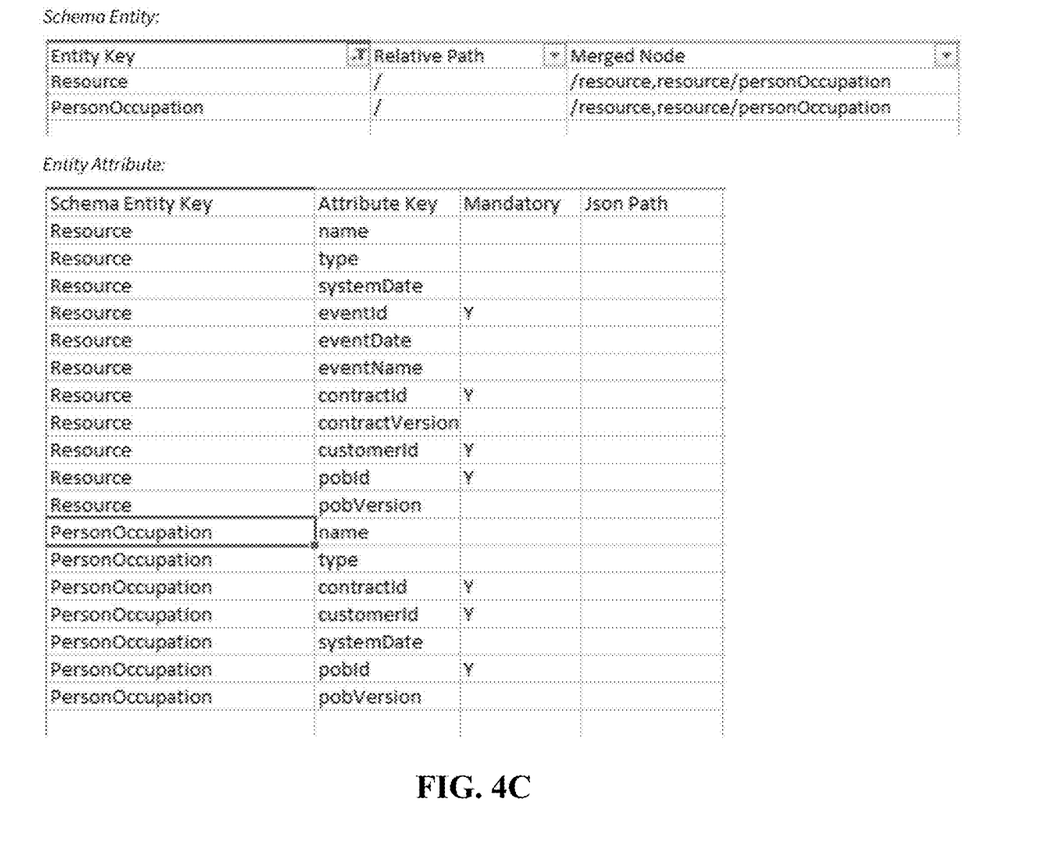

FIG. 4C illustrates a two entities being implemented in the mapping sheet, per Scenario 2.

Table 8 illustrates an exemplary output JSON message according to Scenario 2 and the mapping sheet of FIG. 4C.

TABLE 8

```
{
"entityKey": "Resource"
"name": "CycleEvent",
"type": "CreateResource",
"systemDate": "2018-11-29T15:50:24.631Z",
"eventId": 1,
"eventDate": "2018-11-27T07:47:10.240Z",
"eventName": "Inception",
"contractId": 21,
"contractVersion": 1,
"customerId": 22
},
{
"entityKey": "PersonOccupation"
"name": "CycleEvent",
"type": "CreateResource",
"systemDate": "2018-11-29T15:50:24.631Z",
"customerId": 22,
```

TABLE 8-continued

```
    "contractId": 21,
    "pobId": 91,
    "pobVersion": 211,
},
{
"entityKey": "PersonOccupation"
"name": "CycleEvent",
"type": "CreateResource",
"systemDate": "2018-11-29T15:50:24.631Z"
"customerId": 22,
"contractId": 21,
"pobId": 191,
"pobVersion": 221,
}
```

Scenario 3: The Input JSON Message Contains Key Value Pairs and Two Parallel Arrays of Complex Object Table 9 illustrates an exemplary input JSON message according to Scenario 3.

TABLE 9

```
{
"name": "CycleEvent",
"type": "CreateResource",
"systemDate": "2018-11-29T15:50:24.631Z",
"resource": {
    "eventId": 1,
    "eventDate": "2018-11-27T07:47:10.240Z"
    "eventName": "Inception",
    "contractId": 2,
    "contractVersion": 1,
    "customerId": 22,
    "personOccupation": [{
    "pobId1": 91,
    "pobVersion1": 21,
    "contractId1": 21
    },{
    "pobId1": 191,
    "pobVersion1": 211,
    "contractId1": 21
    }],
    "personInfo": [{
    "personId": 92,
    "personName": "Joe
    },{
    "personId": 67,
    "personName": "John
    }]
  }
}
```

Figure 4D:
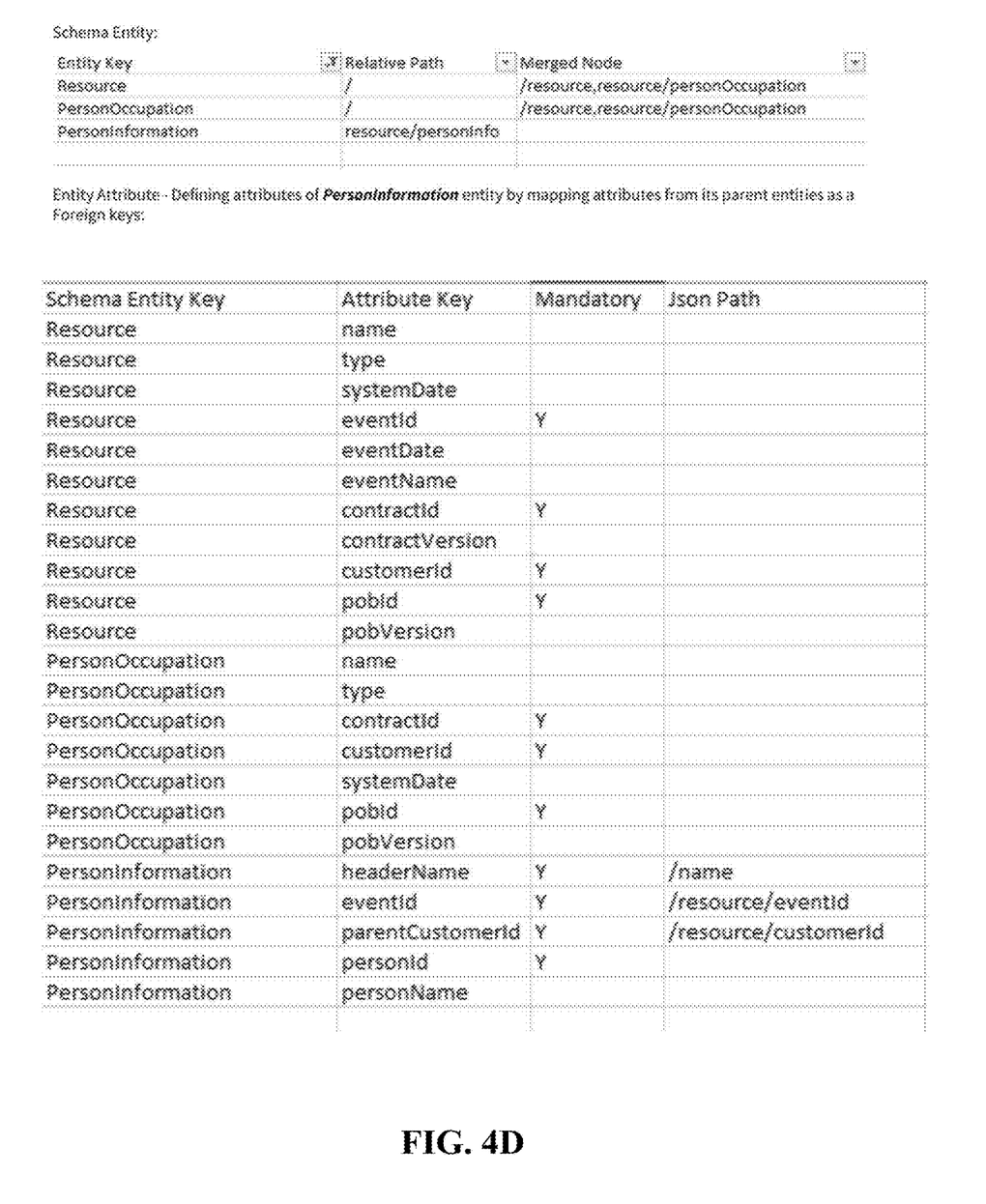

FIG. 4D illustrates the mapping sheet, per Scenario 3.

Table 10 illustrates an exemplary output JSON message according to Scenario 3 and the mapping sheet of FIG. 4D.

TABLE 10

```
{
"entityKey": "Resource"
"name": "CycleEvent",
"type": "CreateResource",
"systemDate": "2018-11-29T15:50:24.631Z"
"eventId": 1,
"eventDate": "2018-11-27T07:47:10.240Z",
"eventName": "Inception",
"contractId": 2,
"contractVersion": 1,
"customerId": 22,
},
{
"entityKey": "PersonOccupation"
"name": "CycleEvent",
"type": "CreateResource",
"systemDate": "2018-11-29T15:50:24.631Z"
"contractId": 2,
```

TABLE 10-continued

```
"customerId": 22,
"pobId": 91,
"pobVersion": 21,
},
{
"entityKey": "PersonOccupation"
"name": "CycleEvent",
"type": "CreateResource",
"systemDate": "2018-11-29T15:50:24.631Z"
"contractId": 2,
"customerId": 22,
"pobId": 191,
"pobVersion": 211
},
{
"entityKey": "PersonInformation"
"headerName": "CycleEvent",
"eventId": 1,
"parentCustomerId": 22,
"personId": 92,
"personName": Joe
},
{
"entityKey": "PersonInformation"
"headerName": "CycleEvent",
"eventId": 1,
"parentCustomerId": 22,
"personId": 67,
"personName": John
},
```

Scenario 4: The Input JSON Message Contains Key Value Pairs and Nested Arrays of Complex Object Table 11 illustrates an exemplary input JSON message according to Scenario 4.

TABLE 11

```
{
"name": "CycleEvent",
"type": "CreateResource",
"systemDate": "2018-11-29T15:50:24.631Z",
"resource": {
"eventId": 1,
"eventDate": "2018-11-27T07:47:10.240Z"
"eventName": "Inception",
"contractId": 2,
"contractVersion": 1,
"customerId": 22,
"personOccupation": [
    {
    "pobId": 91,
    "pobVersion": 211,
    "contractId": 21,
    " additionalDetails ":[{
    "id":100,"reference": "ABC-000"
    },
    {
    "id":200,"reference":"ABC-123"
    }]
    },
    {
    "pobId": 191,
    "pobVersion": 221,
    "contractId": 21,
    " additionalDetails ":[{
    "id":300,"reference": "DEF-000"
    },
    {
    "id":400,"reference":"GHI-123"
    }]
    }
  ]
 }
}
```

Figure 4E:
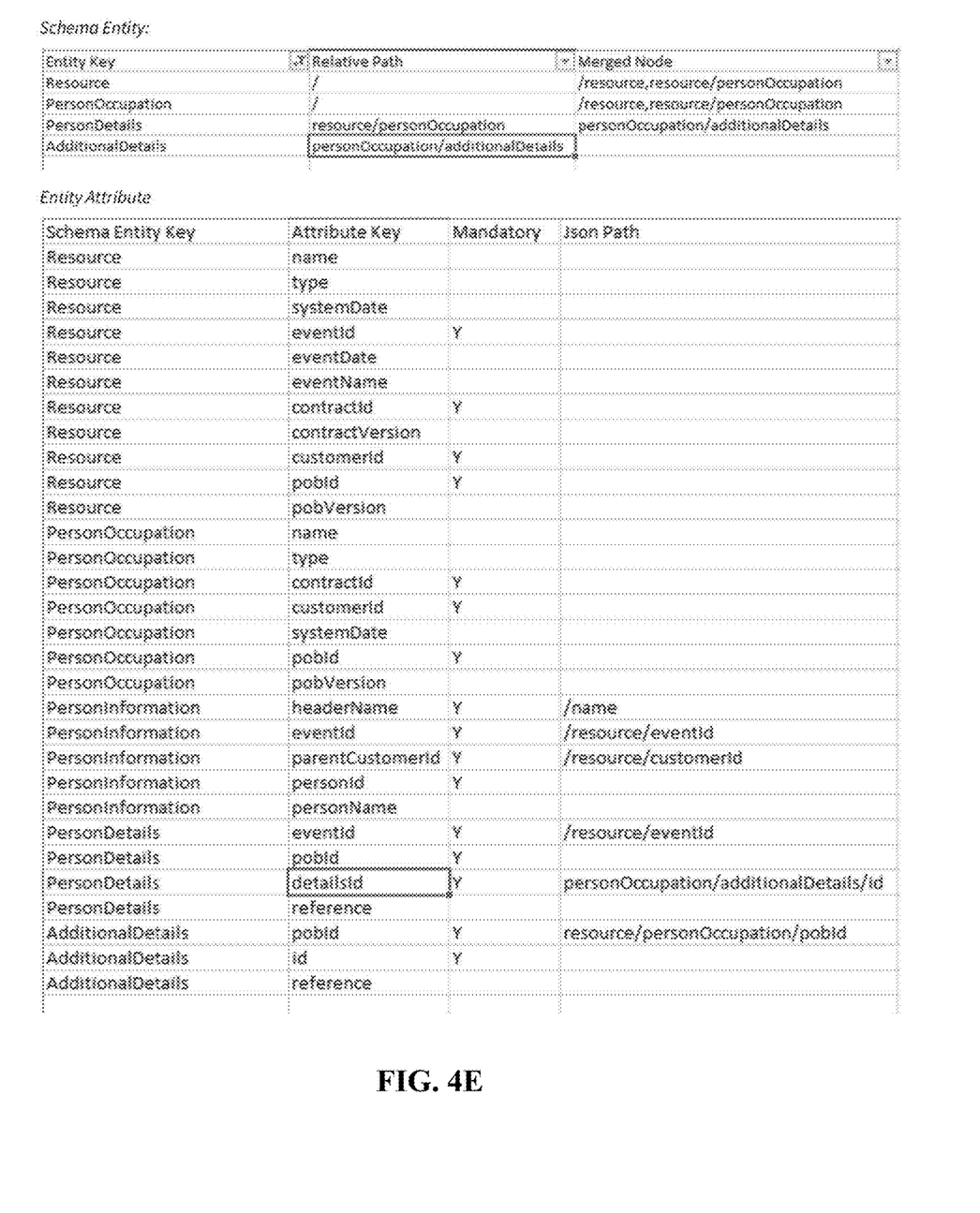

FIG. 4E illustrates multiple entities being implemented in the mapping sheet, per Scenario 4.

Table 12 illustrates an exemplary output JSON message according to Scenario 4 and the mapping sheet of FIG. 4E.

TABLE 12

```
{
"entityKey": "Resource"
"name": "CycleEvent",
"type": "CreateResource",
"systemDate": "2018-11-29T15:50:24.631Z",
"eventId": 1,
"eventDate": "2018-11-27T07:47:10.240Z",
"eventName": "Inception",
"contractId": 2,
"contractVersion": 1,
"customerId": 22,
},
{
"entityKey": "PersonOccupation"
"name": "CycleEvent",
"type": "CreateResource",
"systemDate": "2018-11-29T15:50:24.631Z",
"customerId": 22,
"contractId": 2,
"pobId": 91,
"pobVersion": 21
},
{
"entityKey": "PersonOccupation"
"name": "CycleEvent",
"type": "CreateResource",
"systemDate": "2018-11-29T15:50:24.631Z"
"customerId": 22,
"contractId": 2,
"pobId": 191,
"pobVersion": 211
},
{
"entityKey": "PersonDetails"
"eventId": 2,
"pobId": 91,
"detailsId": 100,
"reference": "ABC-000"
}
{
"entity Key": "PersonDetails"
"eventId": 2,
"pobId": 91,"detailsId": 200,
"reference": "ABC-123"
}
{
"entityKey": "PersonDetails"
"eventId": 2,
"pobId": 191,
"detailsId": 300,
"reference": "DEF-000"
}
{
"entityKey": "PersonDetails"
"eventId": 2,
"pobId": 191,
"detailsId": 400,
"reference": "GHI-123"
}
{
"entityKey": "Additional details"
"pobId": 91,
"id": 100,
"reference": "ABC-000"
}
{
"entityKey": "Additional details"
"pobId": 91,
"id": 200,
"reference": "ABC-123"
}
{
"entityKey": "Additional details"
"pobId": 191,
"id": 300,
"reference": "DEF-000"
```

TABLE 12-continued

```
}
{
"entityKey": "Additional details"
"pobId": 191,
"id": 400,
"reference": "GHI-123"
}
```

Figure 5:
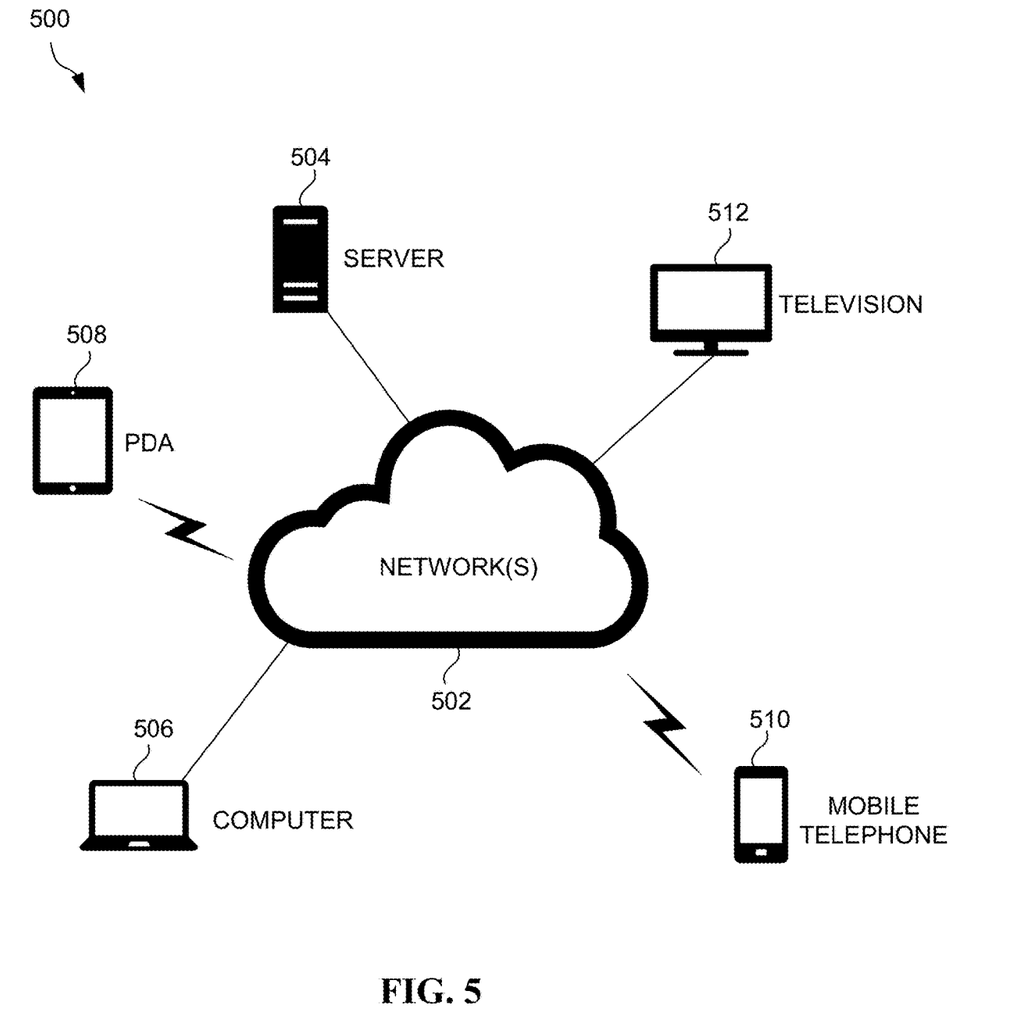
FIG. 5 illustrates a network architecture, in accordance with one possible embodiment.
Figure 6:
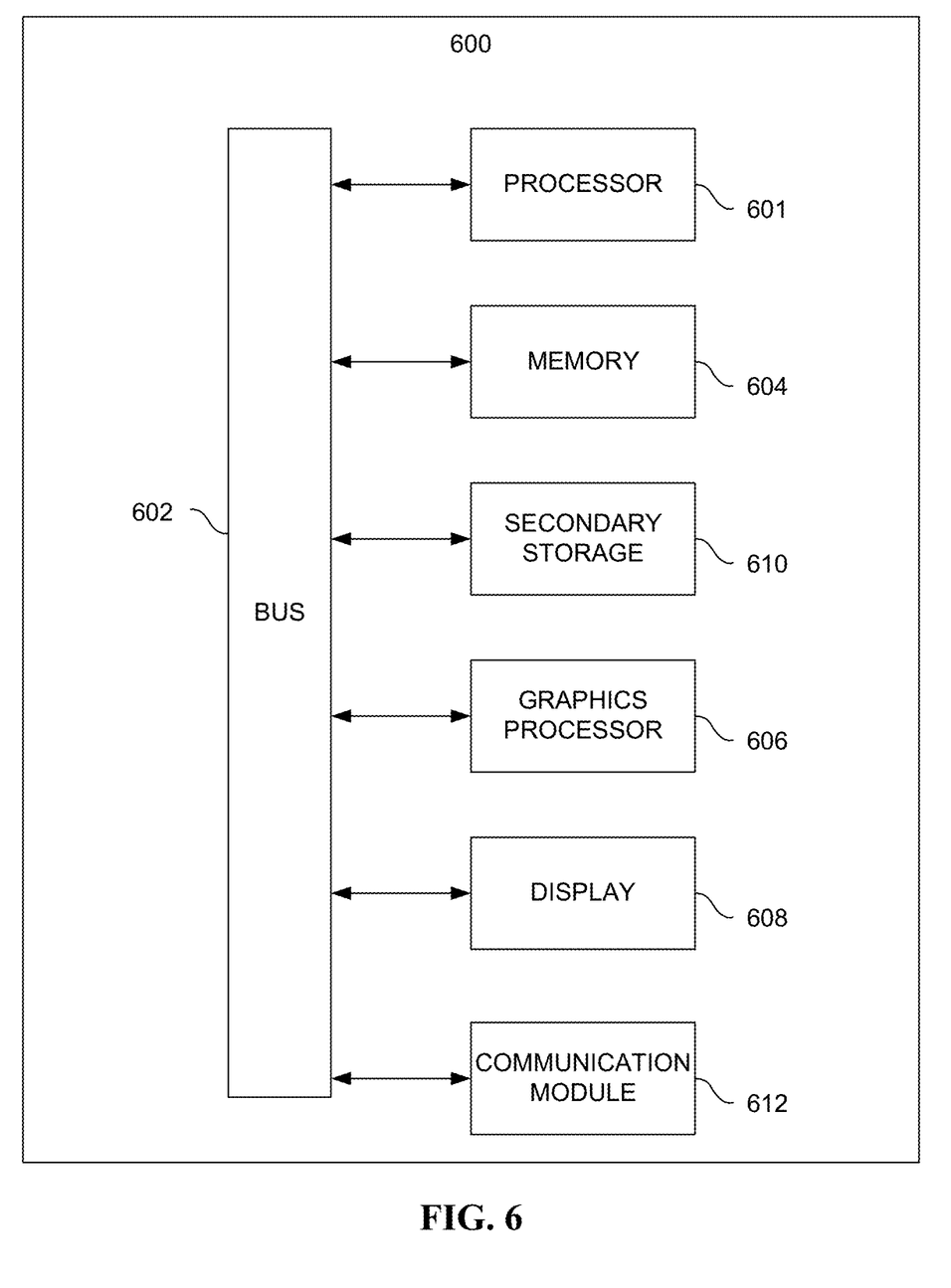
FIG. 6 illustrates an exemplary system, in accordance with one embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to:
receive user input defining a structured format for a target data structure, the structured format including:
at least one entity type capable of being stored in the target data structure, and
a data configuration for each entity type of the at least one entity type,
wherein each entity type requires entities of the entity type to be defined in the target data structure using a relative path;
identify a source JSON structure having a semi-structured format, wherein the source JSON structure includes a plurality of nodes; and normalize the source JSON structure into the target data structure by:
  traversing the plurality of nodes of the source JSON structure to extract metadata from the source JSON structure, the metadata including: nodes values stored in the source JSON structure, a foreign key map listing nodes attributes capable of being used as a foreign key for entities of the target data structure, and a parent entity map listing entities having a common relative path between an object node being traversed and its parent node in the source JSON structure, and
  using the metadata to map values in the source JSON structure to corresponding entities of the target data structure based on the particular structured format defined for the target data structure,
  wherein each entity of the target data structure is defined using the relative path between two of the nodes of the source JSON structure.

2. The non-transitory computer readable medium of claim 1, wherein the user input is received from a user via a user interface.

3. The non-transitory computer readable medium of claim 1, wherein the user input defines attributes of each entity type of the at least one entity type.

4. The non-transitory computer readable medium of claim 3, wherein the user input defines each attribute as optional or mandatory.

5. The non-transitory computer readable medium of claim 1, wherein the user input defines one or more foreign keys for each entity type of the at least one entity type.

6. The non-transitory computer readable medium of claim 1, wherein the source JSON structure includes one of:
  a JSON message containing plain key value pairs,
  a JSON message containing key value pairs and one array of complex object,
  a JSON message containing key value pairs and two parallel arrays of complex object, or
  a JSON message containing key value pairs and nested arrays of complex object.

7. The non-transitory computer readable medium of claim 1, wherein each of the nodes of the source JSON structure is traversed exactly once.

8. The non-transitory computer readable medium of claim 1, wherein the user input defines an entity type of the at least one entity type as a merged node.

9. The non-transitory computer readable medium of claim 8, wherein the merged node represents multiple nodes of the source JSON structure.

10. The non-transitory computer readable medium of claim 1, further comprising:
  after normalizing the source JSON structure into the target data structure, outputting the target data structure.

11. A method, comprising:
at a computer system:
  receiving user input defining a structured format for a target data structure, the structured format including:
    at least one entity type capable of being stored in the target data structure, and
    a data configuration for each entity type of the at least one entity type,
    wherein each entity type requires entities of the entity type to be defined in the target data structure using a relative path;
  identifying a source JSON structure having a semi-structured format, wherein the source JSON structure includes a plurality of nodes; and
  normalizing the source JSON structure into the target data structure by:
    traversing the plurality of nodes of the source JSON structure to extract metadata from the source JSON structure, the metadata including: nodes values stored in the source JSON structure, a foreign key map listing nodes attributes capable of being used as a foreign key for entities of the target data structure, and a parent entity map listing entities having a common relative path between an object node being traversed and its parent node in the source JSON structure, and
    using the metadata to map values in the source JSON structure to corresponding entities of the target data structure based on the particular structured format defined for the target data structure,
  wherein each entity of the target data structure is defined using the relative path between two of the nodes of the source JSON structure.

12. A system, comprising:
a non-transitory memory storing instructions; and
one or more processors in communication with the non-transitory memory that execute the instructions to:
receive user input defining a structured format for a target data structure, the structured format including:
  at least one entity type capable of being stored in the target data structure, and
  a data configuration for each entity type of the at least one entity type,
  wherein each entity type requires entities of the entity type to be defined in the target data structure using a relative path;
identify a source JSON structure having a semi-structured format, wherein the source JSON structure includes a plurality of nodes; and
normalize the source JSON structure into the target data structure by:
  traversing the plurality of nodes of the source JSON structure to extract metadata from the source JSON structure, the metadata including: nodes values stored in the source JSON structure, a foreign key map listing nodes attributes capable of being used as a foreign key for entities of the target data structure, and a parent entity map listing entities having a common relative path between an object node being traversed and its parent node in the source JSON structure, and
  using the metadata to map values in the source JSON structure to corresponding entities of the target data structure based on the particular structured format defined for the target data structure,
wherein each entity of the target data structure is defined using the relative path between two of the nodes of the source JSON structure.

13. The non-transitory computer readable medium of claim 1, wherein the target data structure is output for allowing the target data structure to be queried.

14. The non-transitory computer readable medium of claim 13, wherein the relative path has a query language orientation.

15. The non-transitory computer readable medium of claim 1, wherein the plurality of nodes of the source JSON structure includes:

object nodes each of an object or array datatype, and leaf nodes each storing a value.

16. The non-transitory computer readable medium of claim 15, wherein each entity of the target data structure is a singular view of all the leaf nodes of one of the object nodes to which the entity corresponds, and wherein the entity is defined by the relative path of the one of the object nodes to which the entity corresponds.

17. The non-transitory computer readable medium of claim 1, wherein the traversing includes pushing object nodes to a stack as the object nodes are traversed.

18. The non-transitory computer readable medium of claim 1, wherein the traversing includes mapping values of leaf nodes to corresponding entities in the target data structure as the leaf nodes are traversed.

19. The non-transitory computer readable medium of claim 1, wherein the foreign key map is a stack for maintaining a list of nodes attributes capable of being used as a foreign key for entities of the target data structure, and wherein the parent entity map is a stack for maintaining a list of entities having a common relative path between an object node being traversed and its parent node in the source JSON structure.

\* \* \* \* \*